United States Patent [19]
Lu et al.

[11] Patent Number: 5,319,728
[45] Date of Patent: Jun. 7, 1994

[54] HIGH RETURN LOSS FIXED ATTENUATOR

[75] Inventors: Liang-Ju Lu; David J. Emmons, both of Eden Prairie; George B. Pfeffer, Minnetonka, all of Minn.

[73] Assignee: ADC Telecommunication, Inc., Minneapolis, Minn.

[21] Appl. No.: 65,121

[22] Filed: May 20, 1993

[51] Int. Cl.$^5$ ............................................... G02B 6/38
[52] U.S. Cl. ........................................ 385/67; 385/140
[58] Field of Search ...................... 385/66, 67, 70, 72, 385/84, 140

[56] References Cited

U.S. PATENT DOCUMENTS

| | | | |
|---|---|---|---|
| 3,936,143 | 2/1976 | Sato | 385/67 |
| 4,239,333 | 12/1980 | Dakss et al. | 385/67 |
| 4,557,556 | 12/1985 | Decker, Jr. | 385/140 |
| 4,747,659 | 5/1988 | Takahashi | 385/67 |
| 5,179,608 | 1/1993 | Ziebol et al. | 385/81 |

*Primary Examiner*—Frank Gonzalez
*Attorney, Agent, or Firm*—Merchant, Gould, Smith, Edell, Welter & Schmidt

[57] ABSTRACT

Light attenuation through a high return loss fixed attenuator is achieved by controlling the offset of two common fiber axes to achieve a controlled transverse misalignment loss while the ends of the fibers are maintained in physical contact under a spring force of the connectors such that a high return loss is achieved.

13 Claims, 6 Drawing Sheets

HIGH RETURN LOSS FIXED ATTENUATOR

BACKGROUND OF THE INVENTION

1. Field of the Invention

This invention pertains to that portion of the telecommunications industry having data or voice signals transmitted over optical fibers. More particularly, this invention pertains to attenuators for use in attenuating an optical signal.

2. Description of the Prior Art

In the prior art, attenuators for use in optical fiber systems are well known. Attenuators may be variable (i.e., the amount of the attenuation can be varied by the user) or the attenuators may be fixed (i.e., the amount of the attenuation is fixed and not variable by the user).

There are many methods to making a fixed adaptor type fiber optic attenuator (e.g., by angular misalignment of two optical ends, by longitudinal separation of two optical ends or by inserting a light absorbing filter between two optical ends). However, these methods do not achieve a high return loss.

With attenuators, it is desirable to achieve a high return loss. The term "return loss" in fiber optic components plays a significant role when designing highly sensitive systems and instruments. The purity of the optical signal directly affects systems performance (i.e., bit error rate in digital transmission systems and intermodulation distortion in analog transmission systems). When reflected light is guided back to the transmitting laser, it can alter the longitudinal mode distribution of the emitting laser. Thus, the propagation of the optical power in the fiber can change significantly. These modal changes can not be predicted nor can they be avoided. The designer of a system must prevent any light being reflected back to the laser. High return loss fixed attenuators are very useful in high speed fiber optic systems especially in cable television applications.

To be commercially desirable, a fixed attenuator must be capable of a high return loss. Also, such attenuators should be inexpensive. Furthermore, it is desirable to provide a method of manufacturing an attenuator where the amount of the attenuation can be varied at the time of manufacture such that attenuators of a wide variety of various fixed attenuators can be available through a common manufacturing technique.

SUMMARY OF THE INVENTION

According to a preferred embodiment of the present invention, a high return loss fixed attenuator is disclosed. The attenuator includes two optical fibers retained with their respective axes held in parallel spaced apart relation and with the fiber ends in physical contact. The offset of the fibers' axes is a controlled transverse offset with the magnitude of the offset selected to achieve a predetermined attenuation.

DESCRIPTION OF THE PREFERRED EMBODIMENT

Referring now to the several drawing figures in extending therethrough which identical elements are numbered identically throughout, a description of the preferred embodiment of the present invention will now be provided.

Figure 1:
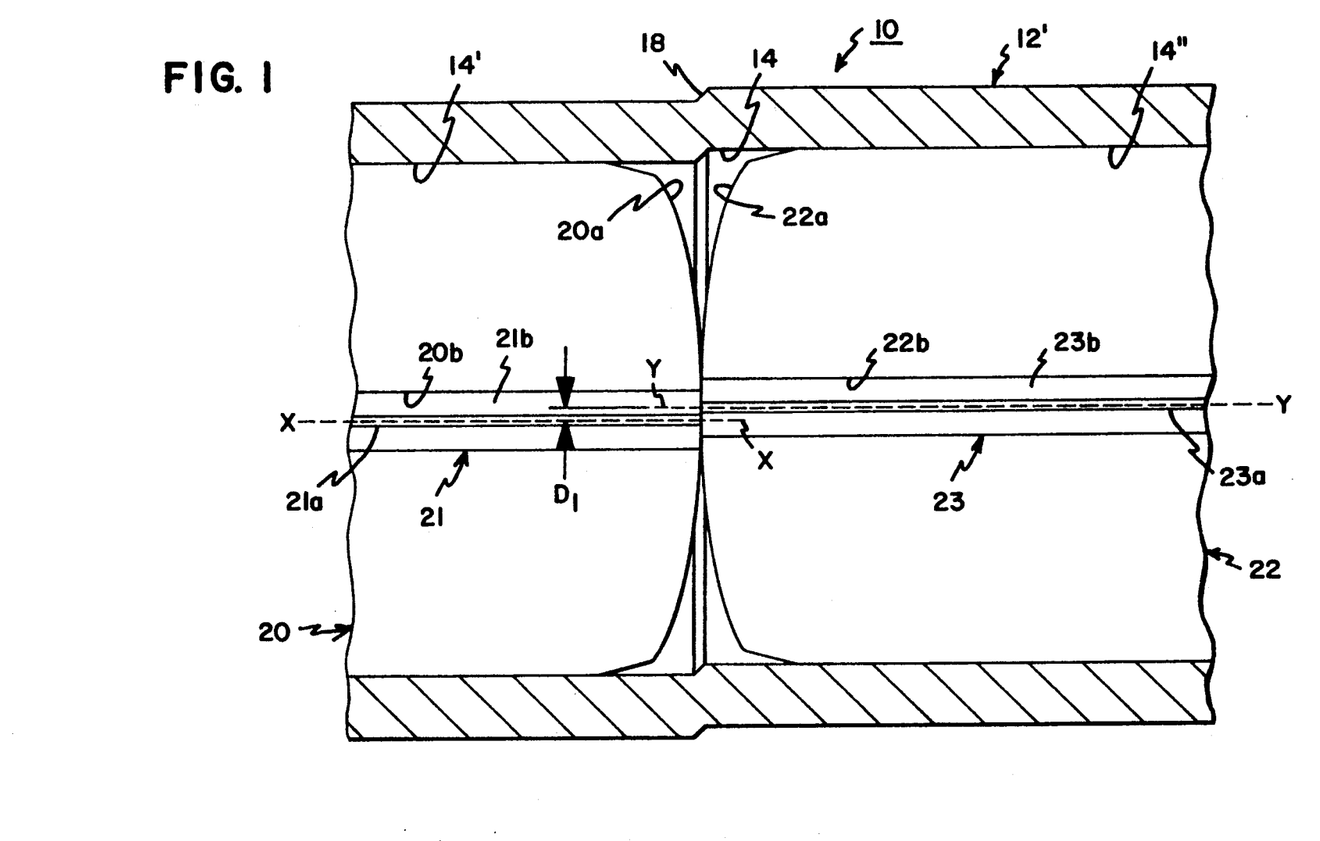
FIG. 1 is a longitudinal cross sectional view of a fixed high return loss attenuator manufactured according to the present invention.

With initial reference to FIG. 1, a high return loss fixed attenuator 10 is shown. The attenuator 10 includes a sleeve 12' having an axial bore 14 including a first bore portion 14' and a second bore portion 14" separated by a sleeve offset portion 18. The first bore 14' has an axis X—X. The second bore 14" has an axis Y—Y. The reader will note that first axis X—X and second axis Y—Y are parallel and offset by a distance $D_1$.

Contained within each of bore portions 14', 14" are ferrules 20, 22. Each of the ferrules 20, 22 is preferably identical.

The ferrules 20, 22 are generally cylindrical. The ferrules 20, 22 are placed within the bore portions 14', 14". In a preferred embodiment, sleeve 12' will be a metallic split sleeve having a slit extending axially through the sleeve 12'. The ferrules 20, 22 are sized to have a diameter slightly greater than the inside diameter of the bore portions 14', 14". Accordingly, upon insertion of ferrules 20, 22 within bore portions 14', 14", the inside diameter of the sleeve 12 expands to receive the ferrules 20, 22 and, due to the natural resilience of the material of sleeve 12', the sleeve generates a spring force to hold the ferrules 20, 22 within the sleeve 12.

The ferrules 20, 22 terminate at axial ends 20a, 22a. Each of the axial ends 20a, 22a is polished to present a convex surface.

Each of the ferrules 20, 22 has an axially extending bore 20b, 22b. Contained within bores 20b, 22b are fixed optical fibers 21, 23, respectively. The fibers 21, 23 are fixed in the bores 20b, 22b with epoxy (not shown).

Each of the fibers 21, 23 includes a centrally positioned axial fiber core 21a, 23a surrounded by a fiber cladding 21b, 23b. Upon insertion of the ferrules 20, 22 into the bore portions 14', 14", the axes of the fibers 21a, 23a are colinearly aligned with the axes X—X, Y—Y, respectively, of the bore portions 14', 14". As a result, the axes of the fiber cores 21a, 23a are offset by the distance $D_1$. However, the axes of the fiber cores 21a, 23a are maintained in parallel alignment. The maintenance of parallel alignment is desirable to avoid an introduction of polarization into the optical signal being transmitted through the fiber cores 21a, 23a. Also, the reader will note that the fibers 21, 23 have their axial ends maintained in direct physical contact (although offset). Physical contact is desirable. In the absence of physical contact, there is a low return loss due to Fresnel refraction.

With the attenuator 10 as shown, the amount of the attenuation through the fibers 21, 23 can be controlled by controlling the amount of the offset $D_1$. The greater the offset $D_1$, the greater the attenuation. With the design as shown, the offset $D_1$ is controlled to effect a transverse offset loss through the fibers 21, 23. The high return loss is achieved by physical contact of the fibers 21, 23 and ferrules 20, 22. As a result, the device provides for only a lateral offset misalignment of the fibers 21, 23. Where there is only a lateral offset misalignment, the attenuation can be approximately independent of polarization and can be calculated by the equation: $A_L = 2.17 (D/W)^2$ dB where Ar means lateral offset attenuation, D denotes transverse offset and W denotes fiber spot size. With the device as shown, we have achieved return losses as high as 55 dB for 0 dB to 45 dB attenuation.

In manufacturing the high return loss fixed attenuators 10, it will be appreciated that control of the lateral offset $D_1$ must be accurately controlled to ensure accurate manufacture of a device with a desired attenuation. To this end, we have developed the method and apparatus to now be described for manufacturing the attenuator 10.

Figure 2:
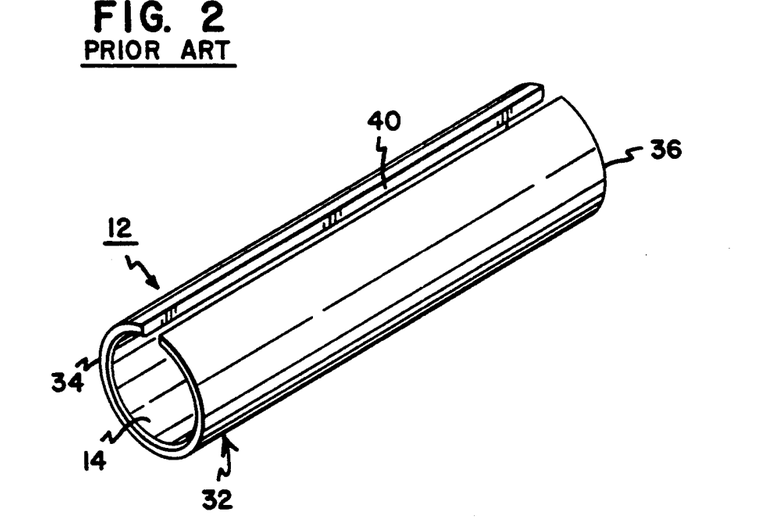
FIG. 2 is a perspective view of a split sleeve for use in fabricating the high return loss attenuator.
Figure 3:
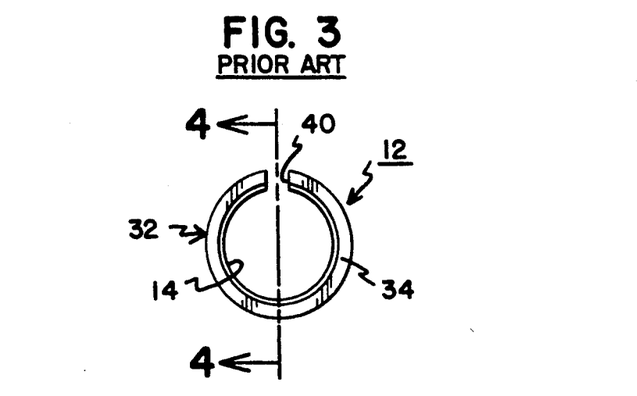
FIG. 3 is an end view of the sleeve of FIG. 2.
Figure 4:
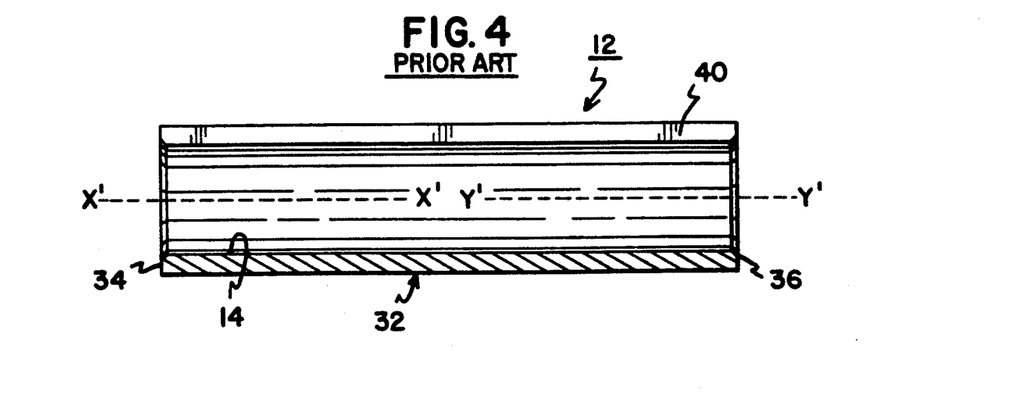
FIG. 4 is a view taken along line 4—4 of FIG. 3.

With reference now to FIGS. 2-4, a split sleeve 12 for use in the manufacturing process is shown. The split sleeve 12 is a split sleeve of conventional construction and includes a generally cylindrical body 32 extending from a first end 34 to a second end 36. The body 32 has a bore 14 extending therethrough.

As best shown in FIG. 4, at the first end 34 the bore 14 has an axis X'—X' which is colinearly aligned with the axis Y'—Y' of the bore at the second end 36. The sleeve 12 also includes a slit 40 extending through the wall of the body 32 and extending the length of the body. The slit 40 is parallel to the colinear axes X'—X' and Y'—Y'. Y'. The sleeve 12 is as shown in FIGS. 2-4 is a commercially available product commonly utilized for containing opposing ferrules in fiber optic technology. The sleeve 12 as shown in FIGS. 2-4 is a blank for use in manufacturing the offset sleeve for use in the attenuator 10.

With reference now to FIGS. 5-8, an apparatus 50 is shown for providing the offset $D_1$ in the finally formed sleeve 12' (shown in FIG. 1). The apparatus 50 includes a base 52 which is flat and can be positioned on a work table or the like. Carried on base 52 are first and second moveable plates 54, 56. Moveable plates 54, 56 are joined together and can be moved parallel to one another along the direction perpendicular of axes A—A and B—B (both parallel to the plane of base 52) by turning knobs 58, 60, respectively. Plates such as plates 54, 56 which are moveable by turning knobs 58, 60 are commercially available products and need not be further described. The commercially available plates 54, 56 are designed such that rotational movements of the knobs 58, 60 causes very minute relative movement of plates 54, 56 such that the plates can be moved relative to one another in controlled amounts of less than one micron.

Figure 5:
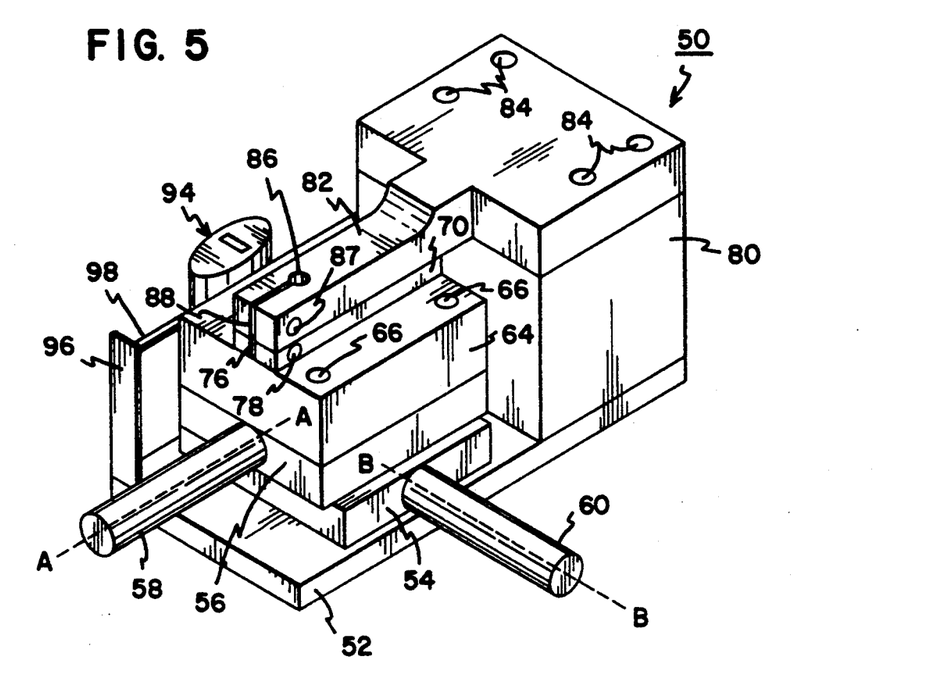
FIG. 5 is a perspective view of an apparatus for deforming the sleeve of FIG. 2 according to the method of the present invention.

In the apparatus of the present invention, the plate 54 is attached to base 52. Handle 60 is unnecessary and is not utilized in the present invention. Turning of handle 60 will not cause movement of the plate 54. Instead, plate 54 is free floating (i.e., freely movable in the direction of axis B—B). Turning of handle 58 causes base plate 56 to move relative to plate 54 in the direction of axis A—A. Mounted to plate 56 for movement therewith is a support block 64 which is fixedly secured to the moveable plate 56 by means of bolts 66.

Figure 6:
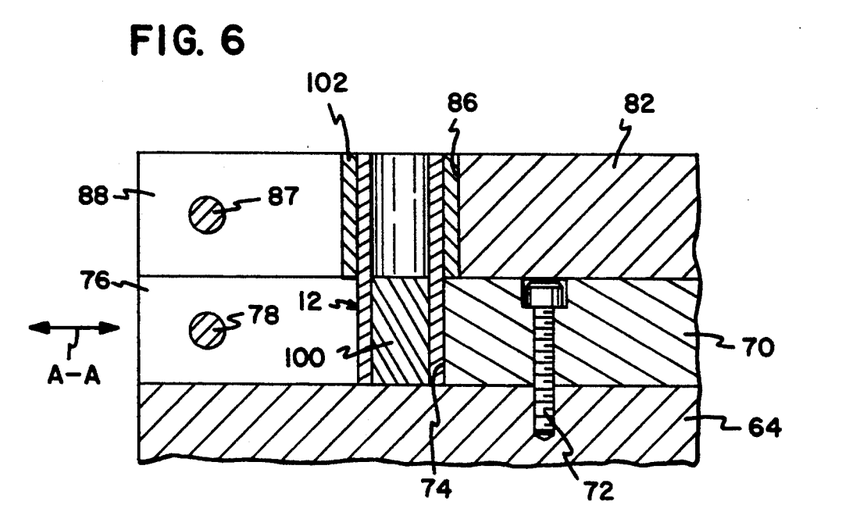
FIG. 6 is a partial sectional view of the apparatus of FIG. 5 shown in a load position.
Figure 7:
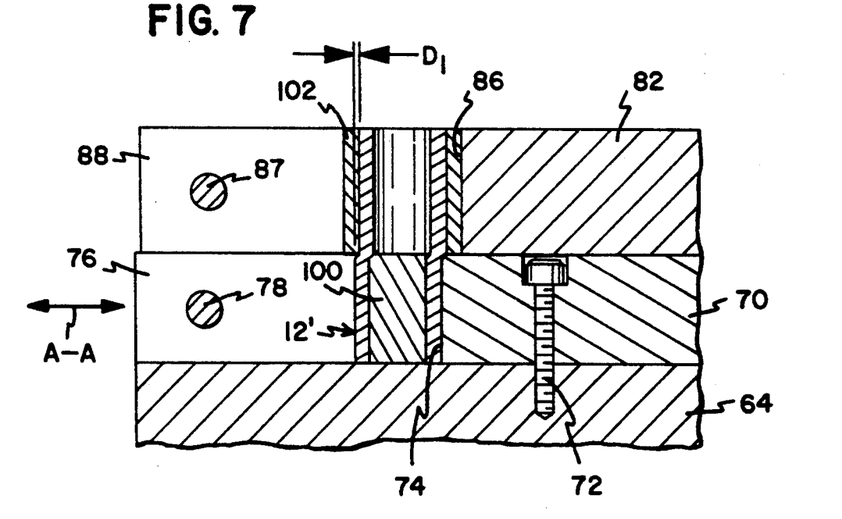
FIG. 7 is the view of FIG. 6 shown in an offset position.

A first retaining bar 70 is secured to an upper surface of support block 64 by bolts 72 (only one of which is shown only in FIGS. 6, 7). The support block 64 includes a bore 74 extending perpendicular to the direction of travel of axis A—A. The retaining bar 70 also has a slit 76 cut through the front of the bar 70 to bore 74. A slit 88 is formed through the front of the second retaining bar to the bore 86.

A spacer block 80 is secured to the base 52. A second retaining bar 82 is secured to the spacer block 80 and the base 52 by means of bolts 84. The second retaining bar 82 has a bore 86 extending perpendicular to the axis of travel A—A with the bore 86 coaxially aligned with bore 74 when the plates 54, 56 are in the load position shown in FIG. 6 as will be more fully described.

A set screw 87 extends through the second retaining bar 82 connecting the portions of the second retaining bar 82 divided by the slit 88. Upon tightening of the set screw 87, the retaining block members are urged together thereby slightly shrinking the diameter of bore 86. Similarly, a set screw 78 is formed through the first retaining bar 70. Upon tightening of the set screw 78, the diameter of bore 74 can be slightly reduced.

A digital readout caliper 94 (FIG. 5) is secured to the block 64 for movement therewith. A vertical reference plate 96 is secured to the base 52 opposing the caliper 94. The caliper 94 has a sensing arm 98 abutting the plate 96. Upon movement of the caliper 94 towards the plate 96, the sensing arm 98 detects the amount of movement and the caliper 94 displays the amount of movement of the caliper 94 towards the plate 96. Accordingly, the caliper 94 can read out the amount of movement of plate 56 moving in the direction of axis A—A upon turning of handle 58. Calipers 94 with sensing arms 98 having capabilities of measuring and displaying movement of one micron or less are commercially available.

Figure 8:
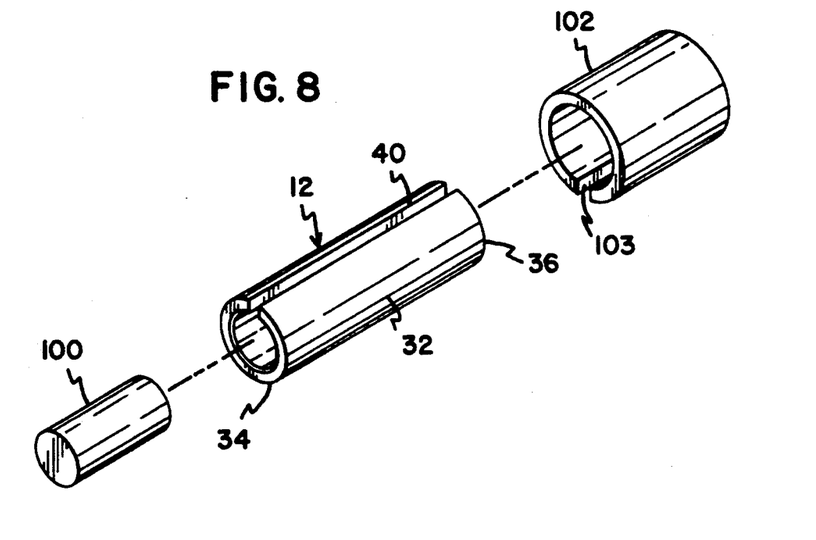
FIG. 8 is a perspective exploded view of a subassembly for use in the apparatus of FIGS. 5–7.

To assist in desired deformation of the sleeve 12, first and second plugs 100, 102 are provided (FIGS. 6, 7 and 8). Plug 100 is a solid cylinder having a length equal to half the length of sleeve 12 and having an outside diameter equal to the inside diameter of the sleeve 12. Plug 102 is a hollow cylinder having an inside diameter equal to the outside diameter of the sleeve 12 and having a length at least equal to half the length of the sleeve 12. A slot 103 extends through the wall of the plug. Slot 103 extends parallel to the axis of the plug 102 and extends the entire length of plug 102. Plugs 100, 102 are made of metal to provide stiffness for reasons that will become apparent.

In use of the present apparatus, plates 54, 56 are moved into position such that bores 74, 86 are coaxially aligned as shown in FIG. 6. The sleeve 12 is placed in the aligned bores 86, 74 with the axis of the sleeve 12 coaxially aligned with the axes of the bores 86, 74. The first plug 100 is placed within the sleeve. The reader will note that the first retaining bar 70 is provided with a thickness equal to half the length of the sleeve. Accordingly, the lower half of the sleeve 12 (using the view of FIG. 6) is retained within and opposed by the material of bar 70. Similarly, the upper half of the sleeve 12 is retained within and opposed by the material of bar 82. Bore 74 is sized to snugly receive the sleeve 12 and the plug 100. Accordingly, bore 74 has a diameter equal to the outside diameter of the sleeve 12. Bore 86 has a diameter equal to the outside diameter of the plug 102.

Accordingly, plug 102 is inserted surrounding the sleeve 12 with the plug 102 disposed between the sleeve 12 and the bar 82. FIG. 6 shows the complete insertion of the sleeve 12 and plugs 100, 102 within the retaining bars 74, 82.

With the assembly shown in FIG. 6, the operator turns handle 58 to cause plate 56 (and hence retaining bar 70) to move in the direction of the axis A—A which is perpendicular to the axis of the sleeve 12. Since bar 82 is stationary relative to bar 70, the sleeve 12 deforms upon such movement as shown in FIG. 7 to form the offset sleeve 12'. The plugs 100, 102 ensure that the sleeve is not deformed in its cylindrical dimension (i.e., there is no radial deformation of the sleeve 12). Instead, the upper half of sleeve 12 is simply offset from the lower half of sleeve 12 as shown in FIG. 7. As a result, the offset sleeve 12' is manufactured to achieve a desired amount of offset $D_1$ calculated to achieve a desired amount of fixed attenuation. By viewing the caliper 94, the operator can determine the precise amount of movement and, hence, the precise amount of offset $D_1$ being applied to the sleeve.

Figure 1A:
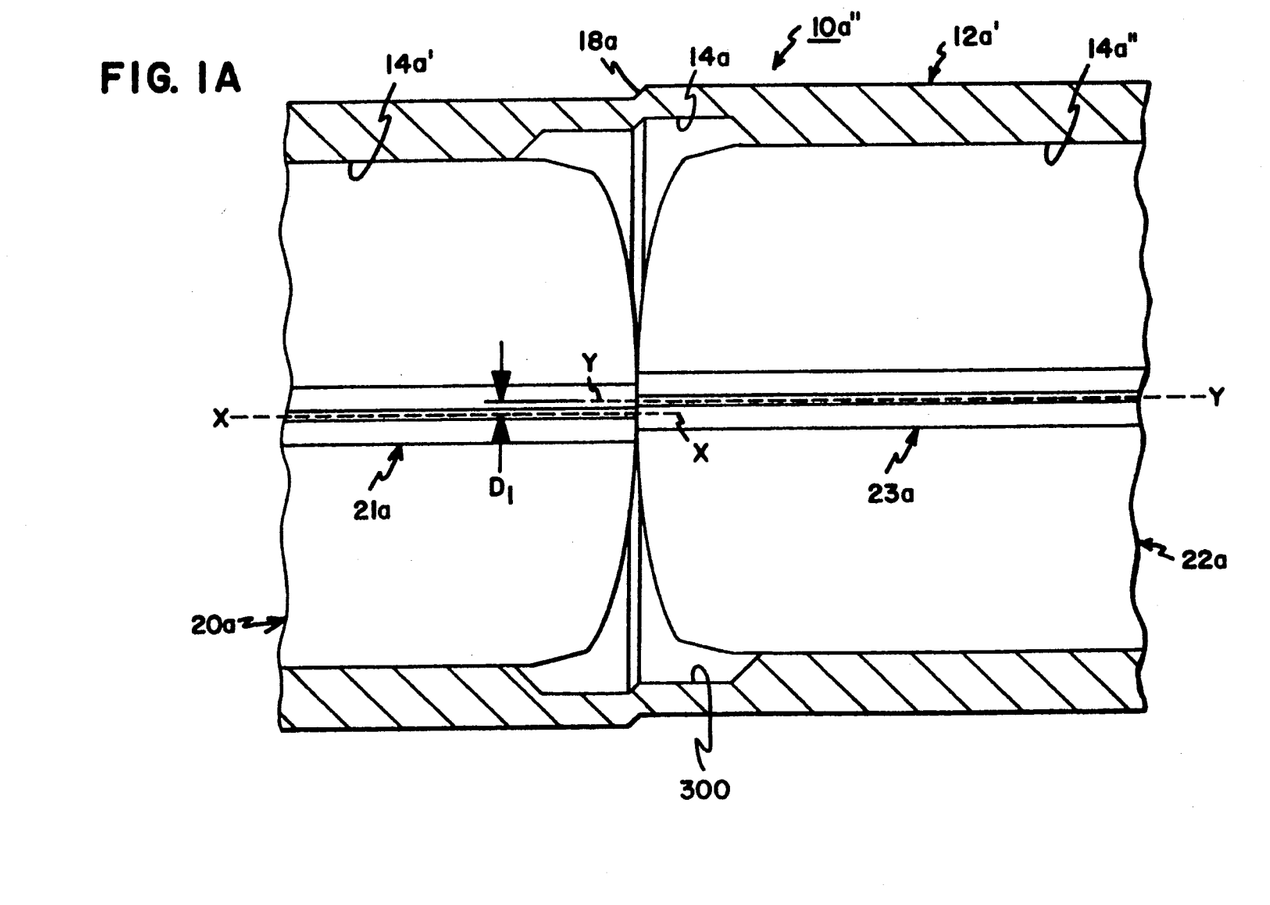
FIG. 1a is the view of FIG. 1 showing an alternative embodiment of the present invention.

The present invention can be modified from the preferred embodiment and still retain the attributes of the invention as claimed. For example, FIG. 1A shows an alternative embodiment to FIG. 1. In FIG. 1A, a recess area 300 is provided formed on the inside surface of the sleeve 12a'. The recess area 300 reduces the probability of interference between the ferrules 20a, 22a and the wall of the sleeve 12a'.

Figure 9:
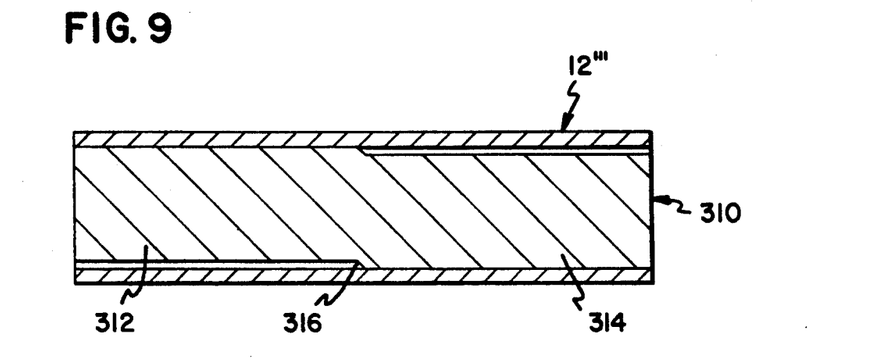
FIG. 9 is a cross-sectional view showing an alternative of manufacture of the present invention.
Figure 10:
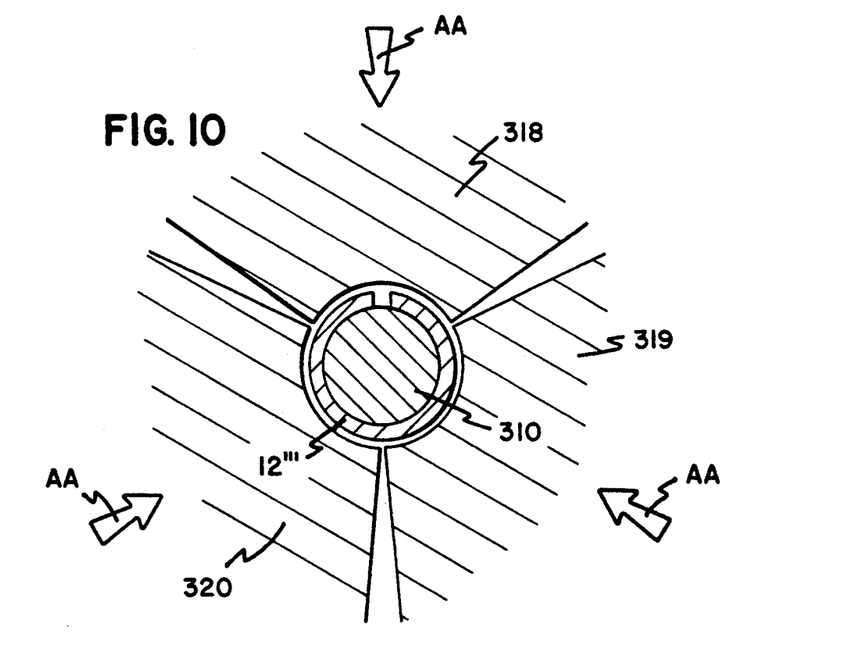
FIG. 10 is a cross-sectional view showing forming of a split sleeve using the assembly of FIG. 9.

In addition to using the device 50 to form the present invention, the split sleeve with the transverse offset can be formed in numerous ways. For example, with reference to FIGS. 9 and 10, a sleeve 12''' is shown surrounding a plug 310. The plug 310 includes a first cylindrical half 312 and a second cylindrical half 314 joined at a transversely offset center 316. As a result, the axes of the cylinder halves 312, 314 are parallel and offset by an amount equal to the desired offset of the split sleeve 12'''. The sleeve 12''', prior to deformation, is placed over the plug 310 as shown in FIG. 9.

Stamping dies 318-319 (FIG. 10) are placed opposing the sleeve and moved radially inward in the direction of arrows AA to stamp the sleeve 12''' such that it assumes the shape of the plug 310. As a result, the sleeve 12''' will have the desired offset.

With the present invention, a controlled offset is placed in the split sleeve to provide a controlled misalignment of the optical fibers retained by the sleeve. In the method of the present invention, a desired attenuation (measured in dB) is predetermined. A theoretical offset necessary to achieve the desired attenuation is calculated. The manufacture of the sleeve is controlled to place the offset in the sleeve to achieve the desired attenuation. In the manufacturing process, a specific offset which achieves the desired attenuation is noted and all future sleeves can be similarly offset to achieve the same attenuation. Alternatively, the return loss can be actively monitored during manufacturing of the split sleeve such each split sleeve is uniquely manufactured to achieve a desired offset.

From the foregoing detailed description of the present invention, it has been shown how the objects of the invention have been attained in a preferred manner. However, modifications an equivalents of the disclosed concepts, such as those which readily occur to one skilled in the art, are intended to be included within the scope of the present claims.

What is claimed is:

1. A method for making a fiber optic attenuator comprising:

selecting a sleeve having a body extending from a first end to a second end, said body having a bore extending axially therethrough with said bore having a first axis at said first end and a second axis of said bore at said second end, said sleeve sized for a first ferrule containing an axially positioned first optical fiber to be received within said bore at said first end with an axis of said first fiber coaxially aligned with said first axis of said bore, said sleeve further sized for a second ferrule containing an axially positioned second optical fiber to be received within said bore at said second end with an axis of said second fiber coaxially aligned with said second axis of said bore; and moving said first end of said sleeve relative to said second end of said sleeve along a path of travel transverse to said first and second axes of said bore by a distance sufficient to permanently deform said sleeve for said first axis to be disposed laterally offset from said second axis.

2. A method according to claim 1 wherein said first and second axes of said bore are colinearly aligned before said moving.

3. A method according to claim 1 wherein said moving includes holding said first end of said sleeve with a first holding means and holding said second end of said sleeve with a second holding means and then moving said first holding means relative to said second holding means along said path of travel.

4. A method according to claim 3 wherein said first and second ends of said sleeves are held and moved for said first and second axes to be maintained in parallel offset alignment.

5. A method according to claim 3 comprising inserting a first retaining plug into said first end with said first retaining plug sized to prevent radial deformation of said sleeve during said moving.

6. A method according to claim 5 comprising inserting a second retaining plug onto said second end with said second retaining plug sized to prevent radial deformation of said second end during said moving.

7. A method according to claim 3 comprising moving said first holding means relative to said second holding means along said path of travel by an amount of travel selected to attain a predetermined amount of offset of said axes calculated to provide a predetermined desired attenuation between optical fibers inserted within said sleeve.

8. A method according to claim 1 comprising, after said moving, placing a first ferrule in said first end and a second ferrule in said second end with each of said ferrules containing optical fibers and with said optical fibers in direct physical contact upon placement of said first and second ferrules within said sleeve.

9. A fixed return loss attenuator comprising:

a sleeve having a body with a bore extending therethrough from a first end to a second end;

said sleeve having an offset portion disposed between said first and second ends, said bore on a first side of said offset portion having a first bore axis offset from a second bore axis of said bore on a second side thereof on a side of said offset opposite said first side;

a first optical fiber disposed within said bore on said first side;

a second optical fiber disposed within said bore on said second side;

each of said first and second fibers fixedly secured within first and second ferrules, respectively;

said first ferrule disposed within said bore on said first side and said second ferrule disposed within said bore on said second side;

said first and second ferrules and said sleeve mutually sized for said ferrules to be retained within said sleeve with axes of said first and second fibers generally coaxial with said first and second, respectively, bore axes and with opposing terminal ends of said fibers offset.

10. An attenuator according to claim 9 wherein said first bore axis is parallel to and offset from said second bore axis.

11. An attenuator according to claim 9 wherein said first and second fibers terminate at first and second, respectively, terminal ends within said sleeve with said terminal ends disposed in abutting opposing relation.

12. A fixed return loss attenuator comprising:
a first optical fiber terminating at a first free end with a core of said first fiber generally straight at said first free end;

a second optical fiber terminating at a second free end with a core of said second fiber generally straight at said second free end;

means for holding said first and second optical fibers in a controlled misalignment with a first axis of said first fiber at said first free end being generally parallel to and spaced from a second axis of said second fiber at said second free end and with said first free end opposing said second free end in optical signal transmitting relation, said means further holding said fibers with said first and second fibers being axially separable.

13. An attenuator according to claim 12 wherein said free ends abut one another.

* * * * *